INVENTORS
Jay P. Walker
Clarence O. Glasgow
BY Arthur L. Wade

June 28, 1960 J. P. WALKER ET AL 2,942,689
TREATMENT OF CRUDE OIL
Filed April 25, 1958 2 Sheets-Sheet 2

INVENTORS
Jay P. Walker
Clarence O. Glasgow
BY Arthur L Wade

United States Patent Office 2,942,689
Patented June 28, 1960

2,942,689

TREATMENT OF CRUDE OIL

Jay Poisar Walker and Clarence O. Glasgow, Tulsa, Okla., assignors to National Tank Company, Tulsa, Okla., a corporation of Nevada Filed Apr. 25, 1958, Ser. No. 730,942

15 Claims. (Cl. 183—2.7)

The present invention relates to the treatment of crude petroleum. More particularly, it relates to method and apparatus for treating crude petroleum and simultaneously removing therefrom certain light hydrocarbon cosntituents while retaining in the oil so denuded a major portion of the next higher boiling hydrocarbon constituent.

The crude petroleum of a well stream may contain water. This water may be free or a portion emulsified with the oil. It is desirable to remove this water from the crude oil to avoid the expense of transporting it any distance and in order to bring the product to a saleable state. One conventional procedure for treating the crude oil comprises heating it to a temperature sufficient to separate the liquid and gaseous phases and to further resolve the water and oil if water is present. The degree of heat necessary to treat crude oil well streams causes the vaporization of those hydrocarbons of the oil having the lighter molecular weights. It is desirable to return a greater proportion of a selected molecular weight range of these vaporized hydrocarbons to a liquid phase for sale.

The range of hydrocarbon molecular weights desirable to remove from saleable, storable, treated oil varies, depending upon conditions of operation and the composition of the crude petroleum. It can be generally stated that the lightest hydrocarbons, methane, ethane and propane, can not be retained in the liquid phase at normal, storable, atmospheric, conditions. It is not practical to transport oil under the pressure which would be necessary to maintain these hydrocarbons in liquid phase before they are passed to gasoline plants, or otherwise recovered. Therefore, it is well to flash, or evolve, these gases in the treating process and either use them for heating purposes on the lease or pass them to a point of recovery in gaseous form.

The next heavier hydrocarbons are the butanes. Depending on the percentage of butanes in the treated oil, the pressure above atmospheric required to maintain them in liquid form may vary from a few ounces to many pounds. The Reid Vapor Pressure of the oil will, of course, vary with change in butane percentage. Again, generally, it may be said that it is desirable to obtain a clean, denuded, oil which is stable at pressures close to atmospheric and at the highest possible gravity. If the lighter hydrocarbons, having a range of molecular weights extending into the butanes, depending on the proportion, are allowed to remain in the treated oil, they will vaporize from the oil in storage and drive off heavier hydrocarbons. This will both lower the gravity and amount of the saleable oil. On the other hand, gas flashed and evolved in the treating process will have many of these saleable, liquefiable, storageable ends retained therein. It is desirable to recover as much of this saleable product as possible. To make this removal with separate fractionating equipment at the well location is expensive. The present invention provides a system for controlling the absorbing of a greater proportion of the butanes, and any heavier hydrocarbons, out of the gas which is flashed and/or evolved from the separating and treating processes, by use of the treated, or denuded, oil.

The present absorption system adds to the system in which the characteristics and components of the well stream are used exclusively for the entire cycle of taking crude petroleum from the well and delivering a maximum of stable, saleable oil to storage. The well stream is used to cool the denuded oil to increase its absorption capacity. Additionally, the well stream is used to condense valuable fractions from the vapors evolved from the treating zone. All uncondensed less valuable, or desirable, vapors may be passed to gasoline plants, or other points of use, or a portion may be used to supply the burner of the treating zone. Denuded oil produced from the heated zone is used, in heat exchange, to heat the well stream as it is brought into the system to initiate the treating process. Finally, the cooled, denuded oil is used to absorb the storageable, valuable, molecular weights of hydrocarbons from the vapors flashed and/or evolved. The well stream itself is thereby used, exclusively, to prepare itself into a marketable product.

It can now be seen that one of the main objects of the invention is the control of the hydrocarbon constituents of gas separated and/or evolved from the treating of crude petroleum by use of the absorption capaicty of the demulsified, or denuded, oil.

Another object is to employ only the portion of denuded oil necessary to absorb the greater proportion of a selected molecular weight range of hydrocarbons from the gas flashed and/or evolved from the treating of crude petroleum.

Another object is to reduce the temperature of the portion of denuded oil used to absorb the hydrocarbons to increase its absorption capacity and to simultaneously raise the temperature of the well stream to initiate the treating process of the well stream.

Another object is to employ the characteristics and components of the well stream itself to produce the maximum possible saleable, stable, liquid product from the crude petroleum of the well stream.

The present invention contemplates provision of an absorbing tower wherein the denuded oil from the treater is used to contact the gaseous fractions separated and/or evolved from the treater in order to absorb from this gas the greater proportion of a selected molecular weight range of hydrocarbon constituents. The amount of denuded oil used for this absorbing process is controlled in order to use only that amount required to keep to a predetermined minimum the selected molecular weight range of hydrocarbons in the total gaseous output from the tower.

In another aspect the invention contemplates division of a part of the gaseous fractions, flashed from the well stream in a separation step through an absorbing tower. Denuded oil from a treater is then routed in controlled portions through the tower to absorb a greater proportion of the hydrocarbons of a selected molecular weight range from the gas. All gaseous fractions evolved in the treating step are routed through the tower. The portion of the flashed gas which is not diverted through the tower is combined with the total output of the tower to form a total gaseous product having a predetermined composition of hydrocarbons.

Another aspect of the invention contemplates the combination of an absorbing tower and treater with a heat exchanger for the well stream and denuded oil of the treater. The well stream is thereby heated to initiate the treating process. A portion of the denuded oil is thereby cooled to increase its absorbing capacity. The portion of the denuded oil from the treater which is directed through the heat exchanger and tower is controlled by an element responsive to the composition of the gaseous output of the tower. Finally, the portion of the flashed gaseous output of the treater directed through the tower is determined by a control system determining the amount of the heavier hydrocarbons of a selected molecular weight in the total gaseous product line from the combination of treater and tower.

Another aspect of the invention contemplates a combination of heat exchanger, absorbing tower, separator and treater in which the well stream is used to cool denuded, absorbing oil in the exchanger, and cool a wall of the separator to condense valuable hydrocarbon vapors thereon evolving from the treater. Denuded absorbing oil from the treater is utilized to heat the well stream in the exchanger. A portion of the less valuable vapors flashed in the separator are burned as a source of heat for the treating section. The process is completed by intimately associating the denuded oil and vapors flashed and evolved to absorb from the vapors a predetermined portion of valuable fractions.

The invention is more specifically described by reference to the accompanying drawings in which.

Figure 1:
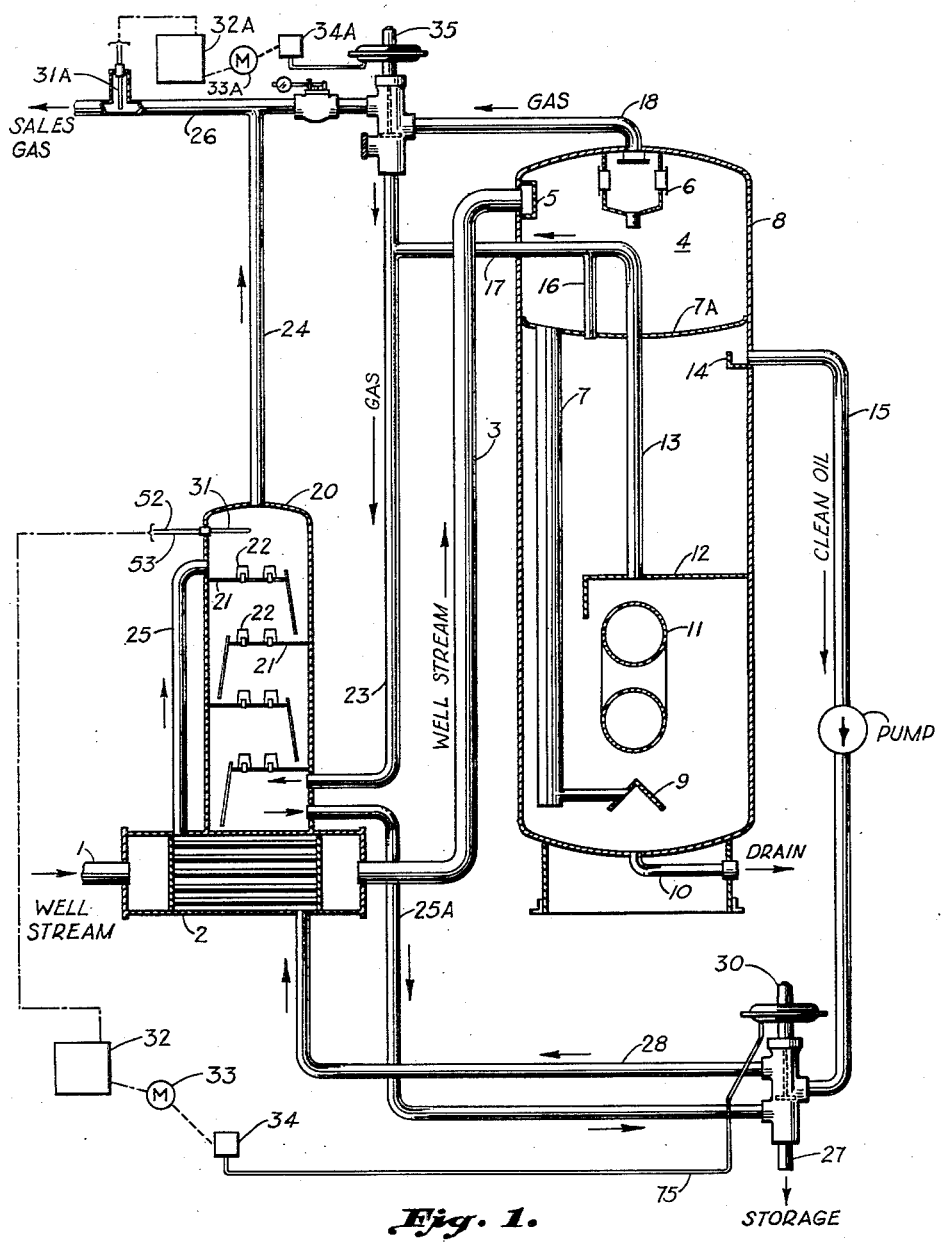
Fig. 1 is a somewhat diagrammatic illustration of a treating-absorbing apparatus combination as one embodiment of the invention.

Fig. 1, diagrammatically, illustrates a complete system in which the present invention is embodied. The fluid circuit of this system is traced from conduit 1, which brings the well stream of crude petroleum into the system. The well stream is passed through heat exchanger 2. In heat exchanger 2 the well stream is heated to initiate the freeing of any water that may be in the stream and breaking of any emulsion. At the same time gaseous fractions are released as well as foam. Conduit 3 then takes the well stream from exchanger 2 to separator section 4. A conventional diverter plate 5 spreads the well stream, by tangential flow, over internal walls of separator section 4. This initial separation can be accomplished by any number of well-known arrangements. The pressure reduction on the well stream at this point causes gaseous fractions to flash from the well stream. It is common to provide a mist extractor 6 through which the flashed gas passes upwardly and a conduit 7 which passes the liquid phases downwardly. Bottom 7A of the separator section 4 is cooled by the contact with the liquid phases.

Conduit 7 represents conventional arrangements for passing the liquid phases of the well stream downwardly. The conduit 7 terminates in a spreader plate 9 beneath a source of treating heat. Any free water in the well stream passing down conduit 7 falls to the bottom of the treater shell and is drawn off through conduit 10. The balance of the liquids of the well stream is spread by 9 in order to denude the stream of foreign matter and the volatile gases as the stream is flowed up and around firetube 11.

A hood 12 is usually provided above firetube 11. Hood 12 retains the liquids above firetube 11 so they will receive maximum heating and more completely evolve gases of both stable and unstable characteristics. The result is a high degree of agitation of the lighter rising fluids on their way to being withdrawn as denuded, or clean, oil. Most of the gas evolved beneath hood 12 is passed upwardly by conduit 13. Oil and foreign matter, separated by the heat of firetube 11, will stratify in accordance with their specific gravities. Water, and any other foreign matter, will be drawn out of the treater through outlet 10, along with previously precipitated free water.

The denuded oil is skimmed by weir box 14 and is drawn through conduit 15. A pump is indicated as in conduit 15. Should the well supplying the well stream not produce at regular rates and large heads occur, the pump may be desirable to prevent the system from flooding and to insure a relatively low operating pressure for the system.

The gaseous fractions evolved above hood 12 contact the relatively cool head 7A. Condensation of the valuable portions of these fractions takes place, the liquid falling down into the oil passing out conduit 15, denuded of the less valuable fractions. The gaseous fractions which fail to condense are passed upwardly through conduit 16.

Conduits 13 and 16 join in conduit 17 to pass evolved gas from the treating zone. Gas, flash-separated from the well stream in separator 4, is passed out mist extractor 6 into conduit 18. Although not specifically illustrated, it is to be understood that a portion of the separated gas of conduit 18, or the tail gas from the complete system, may be used to supply the burner of firetube 11 to heat the treating zone.

Invention is embodied in the process and apparatus in which these liquid and vapor phases are handled in going to, and coming from, treater 8. The well stream, and its components, is used to produce the ultimate product, which is merchantable oil in the largest quantity and of the highest gravity possible from the particular well stream. An important element in this complete use of the well stream is absorption tower 20.

Absorption tower 20 is used to intimately contact the gaseous phases from treater 8 with denuded oil taken therefrom in order for the denuded oil to absorb valuable fractions of hydrocarbons from the gas. It is desired to operate this tower so the greater proportion of a selected molecular weight range of hydrocarbons removed from the gas and absorbed into the liquid phase of the denuded oil may be stored at economic pressures, raising the gravity and volume of the marketable oil.

The physical construction of absorbing tower 20 may take any form which will intimately contact liquid and gaseous phases. As illustrated, it consists essentially of a shell with trays 21 passing liquid from the top of the shell to the bottom and bubble caps 22 which provide for gas to pass up the shell and through the liquid on trays 21 for intimate contact with the liquid.

The gas passed up shell 20 is brought to the shell through conduit 23, under the lowermost of the trays 21. After contacting the liquid on trays 21 intimately, through bubble caps 22, the gas is passed from the top of shell 20 through conduit 24.

The liquid on trays 21 through which the gas is passed by means of bubble caps 22, is brought in on the topmost of the trays 21 by conduit 25, passed down the successive trays 21 and removed from the bottom of the tower 20 by conduit 25A. Thus is provided an intimate, countercurrent flow of the liquid and gaseous phases through column 20 which results in the liquid oil denuding the gas of all but a smaller proportion of the heavier, selected molecular weight, hydrocarbons.

The objects of the invention are more fully developed by appreciating this function of absorption column 20 in combination with treater 8. Using this structure as a means for the denuded oil from the treater to denude the gas of the treater results in removing from the gas a greater proportion of its heavier hydrocarbon constituents. The gas flashed in the separating section 4 and that evolved into conduit 17 may all be passed through tower 20 to deliver to conduit 26 a total gaseous product from the system which contains only a small proportion of the hydrocarbons of the lighter molecular weights which will not remain in a liquid phase under economic pressures and normal ambient temperature. It is also appreciated that in view of some particular conditions under which this combination of absorption column and treater are operated, that it may be desirable to leave a selected portion of the heavier hydrocarbon constituents in the total product gas of conduit 26. Therefore, control is provided over the proportion of gas sent through absorption column 20.

It is also contemplated that it may be necessary to adjust the quantity of denuded oil placed in the upper portion of tower 20 for denuding the gas which is passed through tower 20. Therefore, control is exerted to proportion the denuded oil from conduit 15 between conduit 28 to tower 20 and conduit 27 to storage. A control system automatically analyzes the gaseous product from column 20 and adjusts the quantity of denuded oil from conduit 15 into conduit 25 which will maintain the output of the tower to a composition which includes a predetermined minimum of the selected heavier molecular weight hydrocarbons taken to tower 20 through conduit 23.

Another important element of the combination is heat exchanger 2. As shown, and previously indicated, the well stream of conduit 1 is passed through the tube side of heat exchanger 2 and into conduit 3. Additionally, that portion of the total denuded oil from treater 8, in conduit 15, which is split off, into conduit 25, is taken by conduit 28 into the shell side of heat exchanger 2 and delivered to conduit 25.

Heat exchanger 2 accomplishes at least two purposes. First, the well stream is given an initial heating before reaching the separation chamber 4. This initial heating is actually the beginning of the treating process. Heat introduced at this point starts evolving gas and precipitating water that may be in the stream. The result is that the separation in chamber 4 is helped by this preparation in its function of resolving the gaseous and liquid phases of the well stream, and the two parts of the liquid phase, traveling down conduit 7, are started toward a more complete separation. Second, the denuded oil from the treating zone is cooled to increase its absorbing capacity. In the treating zone the denuded oil and evolved vapors are near equilibrium. Cooling the denuded oil in exchanger 2 increases the ability of the oil to absorb the hydrocarbons in the gas with molecular weights falling within the selected range.

Regulation of the proportion of the conduit 15 denuded oil split between storage conduit 27 and conduit 28 of exchanger 2 is accomplished with valve 30. The valve element within the body of this valve splits the flow through conduit 15 in a proportion established by its position within a range of positions. The valve element is urged in one direction by a spring and is moved in the other direction by a diaphragm. The control fluid pressure placed on the diaphragm is developed by the control system which analyzes the gaseous product out of tower 20. If the analysis shows a deviation from the desired hydrocarbon content out of the tower, valve 30 is positioned to adjust the amount of denuded oil taken to the tower as an absorbing medium to return the gaseous output of the tower to its desired hydrocarbon content.

The control system analyzing the gaseous product from tower 20 is illustrated, in Fig. 1 as comprising a probe 31 which develops an electrical signal. Probe 31 is incorporated, as an element, of an electric network within instrument 32. The circuit of instrument 32 controls the rotation of motor 33 whose motion is used to control a mechanical fluid pressure transducing device 34. The fluid pressure output of 34 is imposed upon the diaphragm of valve 30 to position it until the flow through conduits 28 and 25 is adjusted to return the analysis of the gaseous product, made by probe 31, to its desired value.

To exert control over that proportion of separated gas in conduit 18 combined with the evolved gas of conduit 17, valve 35 is connected to join conduits 18, 23 and 26. Depending on the position of the valve element of 35, the fluid flowing through conduit 18 is divided by valve 35.

Valve 35 is positioned by a control system continuously analyzing the product of conduit 26. It is first determined what proportion of the heavier hydrocarbons it is desired to pass into conduit 26. Valve 35 is adjusted to divide off the necessary portion of separated gas in conduit 18 which it is necessary to denude in the tower 20 to maintain this predetermined minimum of hydrocarbons of the selected molecular weight range. Probe 31A then actuates the electric network of instrument 32A to control the rotation of motor 33A. Motor 33A in turn controls transducer 34A to develop a fluid pressure to actuate valve 35 in proportioning the flow of conduit 18 between 23 and 26.

Figure 2:
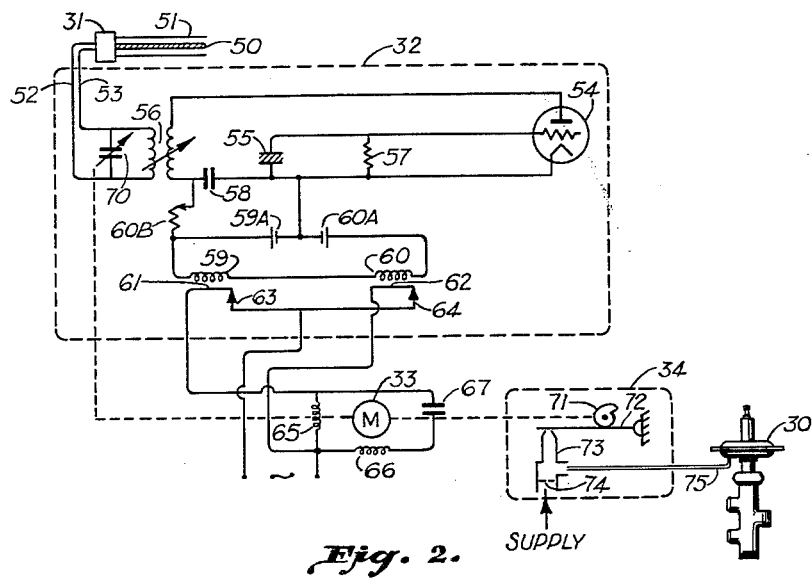
Fig. 2 is a diagrammatic illustration of a control system for the regulating valves of the apparatus of Fig. 1.

Referring to Fig. 2, there is shown a schematic illustration of a representative of the control circuits which make an analysis of the gaseous phases in Fig. 1 and controls the valves to reduce any deviation of the analysis from their set-point values. The control system for valve 30 is specifically considered as representative of both systems.

The probe 31 is shown in more detail than in Fig. 1 in order to make it clear that, as a condenser, it is comprised, essentially, of electrode 50 and sheath 51. Leads 52 and 53 include the condenser-probe 31 in the circuit 32. The circuit 32 develops a control signal for motor 33. Motor 33 is mechanically connected to mechanical-fluid pressure transducer 34 in order that a fluid pressure will be developed in conduit 54 for the diaphragm of valve 30.

This general, and specific, arrangement is disclosed in Gunst et al. 2,720,624. As explained in that patent, it is known that hydrocarbons of different molecular weights have distinguishing dielectric constants. Although it has been customary in making dielectric-constant measurements to pass the material to be tested through an electrical condenser whose electrical capacity is measured in a bridge circuit, this circuit disclosed by Gunst et al. overcomes errors of measurement, the sensitivity to capacity changes, frequency changes, etc. The disclosed circuit employs an electric condenser connected in a crystal-oscillator circuit of a kind which undergoes a large step in the D.-C. plate current of its vacuum tube. The large step effects operation of relays which may be employed for actuating an indicator, alarm, recorder, controller or any other desired exhibiting means.

Similar to the circuit in the Gunst patent, the circuit of 32 has an oscillator tube 54. A quartz crystal 55 is connected in its grid circuit, and it has a tuned plate circuit comprising the condenser formed by 50, 51, connected through adjustable transformer 56. The grid circuit also contains grid resistor 57 connected in parallel with crystal 55. A by-pass condenser 58 is connected between the tuned plate circuit and the cathode.

A controlled circuit is formed of the two relay coils 59 and 60, in series, and two A.-C. sources 59A and 60A, in series. This circuit is fed its input from the tuned plate circuit. An adjustable resistance 60B is included in the loop circuit of coils 59, 60 and sources 59A, 60A as well as the tuned plate circuit.

Relay coils 59 and 60 are polarized. Therefore, alternately increasing and decreasing voltage across them, arranged in series as they are, will cause them to operate in opposite directions. The alternate voltage change comes from the directional detuning of the oscillator circuit. Detuning of the oscillator circuit occurs when there is a change of the dielectric constant to which probe 31 is responsive. Variation of the predetermined proportion of hydrocarbons of a selected molecular weight range in the gas from tower 20 from its predetermined value gives such dielectric constant change.

The armatures 61 and 62 of relays 59 and 60 are normally closed with their contacts 63, 64. Armature-contact sets 61, 63 and 62, 64 are alternately completed to throw the line supply on either motor winding 65 or motor winding 66. Capacitor 67 is arranged to place the field of the windings 90° out of phase from each other so the motor will rotate in one direction when the line supply is applied to winding 65 and in the other direction when the line supply is applied to winding 66. When both relay windings 59 and 60 are energized both contacts are closed and the motor does not move because both motor windings are energized from the line and are dynamically locking the motor.

The circuit of instrument 32 is characterized in that it is operated with a high value of grid resistance, whereby oscillations are maintained for small values of plate circuit capacity. A discontinuity or step takes place in the tube D.-C. plate current when the plate-tuned crystal oscillator goes onto, or out of, oscillation as a result of a change in the tuning of the plate circuit, the latter being accomplished by varying either the capacity of probe 31 or the inductance of coupling transformer 56. A variable capacitor 70 is placed in parallel with probe 31, across leads 52, 53. Adjustment of this capacitance will return the circuit to oscillation. Adjustment of capacitor 70 is accomplished by mechanical connection with motor 33.

At the same time motor 33 balances the circuit of 32 by adjusting capacitor 70, it rotates cam 71 which positions flapper 72 with respect to nozzle 73. Nozzle 73 is supplied a fluid pressure through an orifice 74. The relative position between nozzle 73 and flapper 72 will therefore vary the back pressure established on their side of the orifice 74 and, therefore, in line 75.

Figure 3:
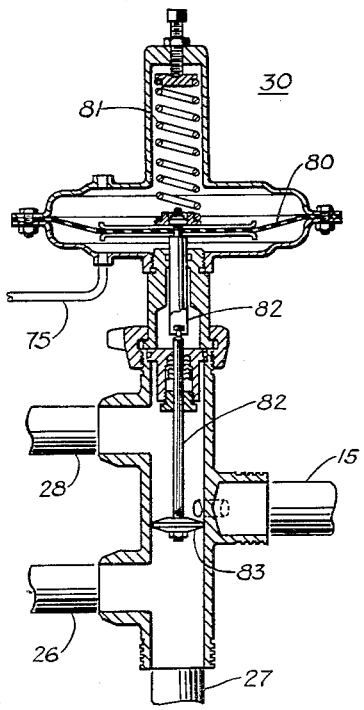
Fig. 3 is a sectioned elevation of a regulating valve used to divide fluid flow in the apparatus of Fig. 1.

Fig. 3 illustrates the structure of valves 30 and 35. Valve 30 is specifically considered as representative of both valves. Valve 30 is shown as functioning in Fig. 1, positioned to establish the proportion of conduit 15 flow sent through conduit 28, returned through conduit 25a and combined with flow through conduit 27.

The control fluid pressure developed by transducer 34 and carried in line 75 is shown as imposed on the underside of diaphragm 80. The force on diaphragm 80 is opposed by the force of spring 81. A range of valves for the fluid pressure of line 75 results in the movement of diaphragm 80, and attached valve stem 82, through a range of positions.

The flow-splitting element 83 in the form of a beveled disc is fixed to the end of stem 82. The disc 83 is sized to a sliding fit in the bore of the body and its range of positions spans openings from conduit 15 into the body bore. By being so positioned, element 83 splits the conduit 15 flow under the command of the control fluid pressure of line 75, resulting in the sending of sufficient amounts of denuded oil to tower 20 to maintain the gas product of conduit 24 at its predetermined value.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of treating crude petroleum and its gases and retaining in the recovered oil a major proportion of hydrocarbons of a selected molecular weight range, which comprises, passing crude petroleum into a treating zone, heating the crude in the zone to resolve its gaseous and liquid phases including denuded oil and to evolve desirable and undesirable hydrocarbon gaseous fractions, feeding a portion of the denuded oil into structure which brings the oil into intimate contact with vapor, passing into the contacting structure at least a portion of the evolved gaseous fractions for intimate contact with the oil, continuously analyzing the gas from the contacting structure to detect the presence of hydrocarbons of a selected range of molecular weights, constantly and automatically utilizing the analysis to control the size of the portion of the denuded oil fed into the contacting structure so the gas will have absorbed from it a predetermined maximum proportion of hydrocarbons of a selected range of molecular weights, withdrawing the denuded gas from the contacting structure, and withdrawing the oil from the contacting structure after it has absorbed a major portion of the hydrocarbons of the selected range of molecular weights.

2. A method of treating crude petroleum and retaining in the recovered oil a greater portion of the hydrocarbons of molecular weights which are storable and saleable as stable liquid, which comprises, passing crude petroleum into a separating zone wherein hydrocarbon gas in the crude is flashed and removed, passing the crude into a heating zone and heating it to resolve its liquid phases including denuded oil and hydrocarbon gaseous fractions, feeding a portion of the denuded oil into a structure for intimate contact with gas, passing combined portions of the flash-separated and evolved hydrocarbon gaseous fractions into the contacting structure for intimate contact with the denuded oil, continuously analyzing the gas from the contacting structure for its constituent of hydrocarbons of storable molecular weight, continuously and automatically utilizing the analysis to control the quantity of the denuded oil fed to the contacting structure in order to absorb from the combined portions of the flash-separated and evolved hydrocarbon gaseous fractions a desired maximum of storable hydrocarbons, withdrawing the denuded gas from the structure, and withdrawing the oil from the structure after it has absorbed the larger proportion of the storable hydrocarbons from the combined portions of the gaseous fractions.

3. The method of claim 2 in which, the crude is passed into heat exchange with the denuded oil before the denuded oil is fed to the contacting structure and before the crude is passed into the separating zone so that the denuded oil portion will be cooled to increase its absorbing capacity and the crude will be heated to initiate the treating process.

4. The method of claim 2 including, combining the denuded gas from the structure outlet with the remaining portion of the separated gas into a total gas, continuously analyzing the combined total gas from the process as to its proportion of hydrocarbons of storable molecular weight, and controlling the size of the separated gas portion which is combined with evolved gas and passes into the structure in accordance with the analysis of the total gas to produce a total gas product with a predetermined proportion of hydrocarbons of storable molecular weight.

5. An apparatus for treating crude petroleum and retaining a major proportion of the hydrocarbons of a selected molecular weight range in the denuded oil produced including, a treater having a heating zone into which the crude stream is conducted, means for supplying heat to the heating zone, first regulating means for splitting off a portion of the denuded oil from the zone, an absorbing tower for bringing liquid and gases in intimate contact, means for conducting the split-off portion of the denuded oil to the tower, means for conducting at least a portion of the separated and evolved gases from the treater to the tower for intimate contact with the denuded oil portion so that the total gas portion will have absorbed from it the major proportion of hydrocarbons of selected molecular weights, an analyzer continuously responsive to the denuded gas portion flowing out of the tower in order to detect the proportion of hydrocarbons of the selected molecular weight range which have not been absorbed from the gas, control means continuously and automatically modulated by the analyzer to position the first regulating means in splitting off the portion of denuded oil for the tower which will absorb a predetermined portion of the hydrocarbons of selected molecular weight range from the gas, and means for taking the saturated oil to storage.

6. The apparatus of claim 5 including, a heat exchanger, and conduits by which the stream to the treater and the denuded oil are heat exchanged to heat the stream to begin the treating and cool the oil to raise its absorptive capacity.

7. The apparatus of claim 5 including, second regulating means for determining the quantity of the total gas from the treater conducted to the tower to be denuded by the oil, means for combining the denuded gas from the tower with remaining gas from the treater to form the total gas output of the apparatus, a second analyzer responsive to the total gas output in order to detect the proportion of hydrocarbons of selected molecular weight range in the total gas, and a second control means responsive to the second analyzer for positioning the second regulating means which will maintain the total gas output with a predetermined proportion of the hydrocarbons of selected molecular weight range.

8. A method of using a well stream of crude petroleum to produce the maximum amount of stable, saleable oil including heating the well stream to initiate the process of its treating, separating liquid and gaseous phases of the well stream, forming a source of heat from at least a portion of the flashed gaseous phase, heating the liquids with the heat source to resolve them into their component parts and to evolve hydrocarbon gas, condensing a portion of the liquefiable hydrocarbons from the gas by the well stream in the separation step, cooling oil denuded of the hydrocarbon gas by heating the well stream to initiate the treating process, contacting at least a portion of the gas with the cooled denuded oil to absorb stable and saleable hydrocarbons therefrom which are liquefiable at substantially ambient conditions, continuously analyzing the gas portion after it contacts the cooled denuded oil to detect its residual content of stable and saleable hydrocarbons which are liquefiable at substantially ambient conditions, and continuously and automatically controlling the amount of cooled oil contacting the gas in accordance with the analysis.

9. A method for treating a petroleum well stream containing gas and liquids to produce a stable product of predetermined storable Reid Vapor Pressure, which comprises, flashing gas from the well stream at a first temperature, passing the remaining liquid of the well stream into a zone in which heat is applied at a second temperature to the well stream to drive off light volatile ends of hydrocarbons from the well stream, collecting the gas driven from the well stream at the second temperature, withdrawing oil denuded of light volatile gas from the heated zone, passing the oil from the heated zone and passing the well stream to the flashing zone in heat exchange relationship to each other to cool the denuded oil and heat the well stream, passing the cooled denuded oil in counter-current flow with the collected gas to absorb hydrocarbons from the gas by the oil which will not raise the vapor pressure of the oil and absorbed hydrocarbons above a predetermined storable vapor pressure, continuously analyzing the denuded gas passed in counter-current flow with the cooled denuded oil to detect its content of those hydrocarbons which will not raise the vapor pressure of the oil above the predetermined vapor pressure, continuously and automatically controlling the quantity of the cool denuded oil portion passed in counter-current flow with the gas in accordance with the analysis, and passing the stable absorbing oil to storage and the denuded gas to a point of recovery and use.

10. A method of treating crude petroleum and its gases and retaining in the recovered oil a major proportion of hydrocarbons of a selected molecular weight range, which comprises, passing crude petroleum into a treating zone, heating the crude in the zone to resolve its gaseous and liquid phases including denuded oil and to evolve desirable and undesirable hydrocarbon gaseous fractions, cooling a portion of the denuded oil with the crude petroleum passing into the treating zone, feeding the cooled portion of the denuded oil into structure which brings the cooled oil into intimate contact with vapor, passing into the structure at least a portion of the evolved gaseous fractions for intimate contacts with the cooled oil, continuously analyzing the gas from the contacting structure to detect the presence of hydrocarbons of a selected range of molecular weights, controlling the size of the portion of the denuded oil cooled by the crude petroleum and fed into the structure so the gas will have absorbed from it a predetermined maximum proportion of hydrocarbons of a selected range of molecular weights as established by the analysis, withdrawing the denuded gas from the contacting structure, and withdrawing the cooled oil portion from the contacting structure after it has absorbed a major portion of the hydrocarbons of the selected range of molecular weights.

11. A method of treating crude petroleum and retaining in the recovered oil a greater portion of the hydrocarbons of molecular weights which are storable and saleable as stable liquid, which comprises, passing crude petroleum into a separating zone wherein hydrocarbon gas in the crude is flashed and removed, passing the crude into a heating zone and heating it to resolve its liquid phases including denuded oil and hydrocarbon gaseous fractions, cooling a portion of the denuded oil with the crude petroleum passing into the separating zone, feeding the cooled portion of the denuded oil into a structure for intimate contact with gas, passing combined portions of the flash-separated and evolved hydrocarbon gaseous fractions into the structure for intimate contact with the cooled denuded oil, continuously analysing the gas from the contacting structure for its constituent of hydrocarbons of storable molecular weight, controlling the quantity of the denuded oil cooled by the crude petroleum and fed to the contacting structure in accordance with the analysis in order to absorb from the gas a desired maximum of storable hydrocarbons, withdrawing the denuded gas from the structure, and withdrawing the cooled oil portion from the structure after it has absorbed the larger proportion of the storable hydrocarbons.

12. An apparatus for treating crude petroleum and retaining a major proportion of the hydrocarbons of a selected molecular weight range in the denuded oil produced including, a treater having a heating zone into which the crude stream is conducted, means for supplying heat to the heating zone, first regulating means for splitting off a portion of the denuded oil from the zone, an absorbing tower for bringing liquid and gases in intimate contact, a heat exchanger receiving the crude stream and the split-off portion of the denuded oil from the heating zone, means for conducting the cooled split-off portion of the denuded oil to the tower, means for conducting at least a portion of the separated and evolved gases from the treater to the tower for intimate contact with the cooled denuded oil portion so the total gas portion will have absorbed from it the major proportion of hydrocarbons of selected molecular weights, an analyzer responsive to the denuded gas portion flowing out of the tower in order to detect the proportion of hydrocarbons of the selected molecular weight range which have not been absorbed from the gas, control means responsive to the analyzer to position the first regulating means in splitting off the portion of denuded oil for the tower which will absorb a predetermined portion of the hydrocarbons of selected molecular weight range from the gas, and means for taking the saturated oil to storage.

13. The apparatus of claim 12 including, second regulating means for determining the quantity of the total gas from the treater conducted to the tower to be denuded by the cooled denuded oil portion, means for combining the denuded gas from the tower with remaining gas from the treater to form the total gas output of the apparatus, a second analyzer responsive to the total gas output in order to detect the proportion of hydrocarbons of selected molecular weight range, in the total gas, and a second control means responsive to the second analyzer for positioning the second regulating means which will maintain the total gas output with a predetermined proportion of the hydrocarbons of selected molecular weight range.

14. A method of using a well stream of crude petroleum to produce the maximum amount of stable, saleable oil including, heating the well stream to initiate the process of its treating, separating liquid and gaseous phases of the well stream, forming a source of heat from at least a portion of the flashed gaseous phase, heating the liquids with the heat source to resolve them into their component parts and to evolve hydrocarbon gas, condensing a portion of the liquefiable hydrocarbons from the gas by the well stream in the separation step, cooling a portion of the oil denuded of the hydrocarbon gas by heating the well stream to initiate the treating process, contacting at least a portion of the gas with the portion of cooled denuded oil to absorb stable and saleable hydrocarbons therefrom, and controlling the amount of the portion of cooled denuded oil contacting the gas in accordance with an analysis of the gas after it has had the hydrocarbons absorbed therefrom.

15. A method for treating a petroleum well stream containing gas and liquids to produce a stable product of predetermined storable Reid Vapor Pressure, which comprises, flashing gas from the well stream at a first temperature, passing the remaining liquid of the well stream into a zone in which heat is applied at a second temperature to the well stream to drive off light volatile ends of hydrocarbons from the well stream, collecting the gas driven from the well stream at the second temperature, withdrawing oil denuded of light volatile gas from the heated zone, passing a portion of the oil from the heated zone and passing the well stream to the flashing zone in heat exchange relationship to each other to cool the denuded oil portion and heat the well stream, passing the portion of the cooled denuded oil in counter-current flow with the collected gas to absorb hydrocarbons from the gas by the oil which will not raise the vapor pressure of the oil and absorbed hydrocrabons above a predetermined storable vapor pressure, controlling the quantity of the cool denuded oil portion in accordance with the amount of hydrocarbons remaining in the gas, and passing the portion of stable absorbing oil to storage and the denuded gas to a point of recovery and use.

References Cited in the file of this patent
UNITED STATES PATENTS

| | | |
|---|---|---|
| 2,420,115 | Walker et al. | May 6, 1947 |
| 2,720,624 | Gunst et al. | Oct. 11, 1955 |
| 2,771,149 | Miller et al. | Nov. 20, 1956 |